Nov. 2, 1943. E. F. W. ALEXANDERSON 2,333,458
SPEED CONTROL ARRANGEMENT FOR INDUCTION CLUTCHES
Filed Aug. 26, 1942
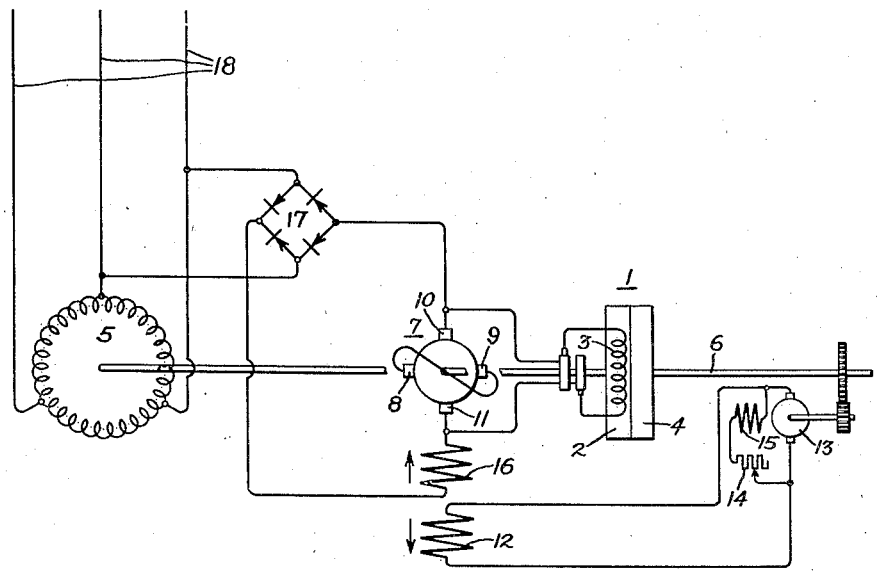
Inventor:
Ernst F. W. Alexanderson,
by Harry E. Dunham
His Attorney.

Patented Nov. 2, 1943

2,333,458

UNITED STATES PATENT OFFICE 2,333,458

SPEED CONTROL ARRANGEMENT FOR INDUCTION CLUTCHES

Ernst F. W. Alexanderson, Schenectady, N. Y., assignor to General Electric Company, a corporation of New York Application August 26, 1942, Serial No. 456,182

3 Claims. (Cl. 172—284)

My invention relates to speed control arrangements for induction clutches, and its object is to provide an improved arrangement for maintaining the speed of the driven member of an induction clutch constant at any desired speed under varying load conditions.

In accordance with my invention, the magnetizing winding of the clutch is energized from a suitable exciter, preferably an amplidyne exciter, the excitation of which is automatically varied inversely with respect to the speed of the driven member of the clutch.

My invention will be better understood from the following description when taken in connection with the accompanying drawing, the single figure of which diagrammatically illustrates an induction clutch speed control arrangement embodying my invention, and its scope will be pointed out in the appended claims.

Referring to the drawing, I represents an induction clutch of any suitable construction, examples of which are well known in the art. As shown, the clutch I comprises a rotatable driving member 2 having a direct current magnetizing winding 3 and a rotatable driven member 4. The energization of the magnetizing winding 3 produces in a manner well known in the art a torque that causes the driven member 4 to rotate at a speed depending upon a load connected to the driven member 4 and the excitation of the magnetizing winding 3. The driving member 2 of the clutch I is driven in any suitable manner, such as by constant speed alternating current motor 5, and the driven member 4 of the clutch I is connected to a shaft 6 to which the load, not shown, is applied.

The magnetizing winding 3 of the clutch I is supplied with direct current from a suitable constant speed exciter 7, which in the particular embodiment shown in the drawing is an armature reaction excited dynamoelectric machine, commonly known in the art as an amplidyne exciter, driven by the motor 5 and so constructed and arranged that small changes in its excitation effect large changes in its output terminal voltage. As shown, the amplidyne exciter 7 has short-circuited brushes 8 and 9, output brushes 10 and 11, which are respectively connected to different terminals of the magnetizing winding 3 of the clutch I, and a control winding 12 which is energized by a pilot shunt generator 13 driven by the driven member 4 of the clutch I in any suitable manner so that the speed of the pilot generator 13 is proportional to the speed of the driven member 4. A suitable adjustable resistor 14 is connected in series with the shunt field winding 15 of the pilot generator 13 so that the voltage thereof for any given speed may be readily adjusted. The pilot generator 13 is adjusted so that it has sufficient residual magnetism to cause the pilot generator to self-excite and build up its voltage to a value dependent upon the speed thereof and the position of the adjustable rheostat in the circuit of the shunt field winding 15.

The amplidyne exciter 7 also is provided with a shunt field winding 16 and is so arranged in any suitable manner that it has a definite and dependable base magnetism which will cause the winding 16 to self-excite and build-up its output voltage to a value dependent upon the resultant excitation produced by the windings 12 and 16 which are differentially arranged. In order to obtain a definite base magnetism in the proper direction to insure proper functioning of the speed control arrangement, the exciter 7 may be designed with a permanent magnet, such as an alnico magnet, in its magnetic circuit or the desired result may be obtained by separately exciting the exciter 7 from a source of current of fixed polarity. In the arrangement shown in the drawing, this desired result is obtained by connecting the output terminals of a full wave rectifier 17, preferably of the copper oxide type, in series with the shunt field winding 16 and by connecting the input terminals of the rectifier 17 across one phase of the alternating current supply circuit 18 from which the constant speed motor 5 receives its energy. Such a connection of the rectifier 17 also insures that the exciter 7 always excites the shunt field winding 16 in the right direction.

The pilot generator 13 and the exciter 7 are so designed that with a given adjustment of the rheostat 14 and a given speed of the driven member 4 of the clutch I, the pilot generator 13 will self-excite and furnish to the control winding 12 of the exciter 7 a current which will neutralize all of the base magnetism of the exciter 7 except just enough to allow the exciter to self-excite and build up its output voltage to a predetermined value. In the particular arrangement shown, this result is obtained by making the ampere turns of the winding 12 substantially equal to the ampere turns of the winding 16 produced by the current supplied to the field winding 16 from the alternating current supply circuit 18 through the rectifier 17. The resultant voltage of the exciter 7 is such that the magnetizing winding 3 of the clutch 1 produces sufficient torque to drive the driven member 4 at the desired speed. If, however, the speed of the driven member 4 increases above the desired value, the voltage of the pilot generator 13 increases with the result that the ampere turns of the control winding 12 increase and effect a decrease in the resultant excitation and in the output voltage of the exciter 7 and in the excitation of the magnetizing winding 3 of the clutch 1 so that the driving torque exerted on and consequently the speed of the driven member 4 is restored to the desired value. Similarly, if the speed of the driven member 4 decreases from the desired value, the pilot generator voltage decreases with the result that the ampere turns of the control winding 12 decrease and effect an increase in the resultant excitation and in the output voltage of the exciter 7 and in the excitation of the magnetizing winding 3 of the clutch 1 so that the driving torque exerted on and consequently the speed of the driven member 4 is increased to restore the speed of the member 4 to the desired value. The combination of the pilot generator 13 and the exciter 7 therefore cooperate to maintain a constant speed of the driven member 4 of the clutch 1 regardless of the load connected to the shaft 6.

The speed which the arrangement holds constantly may be varied by changing the setting of the rheostat 14 and is the speed at which the pilot generator self-excites with any given setting of the rheostat 14.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a speed control arrangement for an induction clutch having a driving member and a driven member, a magnetizing winding on one of said members, an amplidyne exciter supplying current to said winding, two differentially arranged field windings for said exciter, a source of alternating current, rectifying means interconnecting said source and one of said field windings, and means for varying the excitation of the other field winding in response to the speed of said driven member.

2. In a speed control arrangement for an induction clutch having a driving member and a driven member, a magnetizing winding on one of said members, an amplidyne exciter supplying current to said winding, a shunt field winding for said exciter, a source of alternating current, a full wave rectifier having its input terminals connected to said source and its output terminals connected in series with said shunt field winding, a control winding for said exciter arranged differentially with respect to said shunt field winding, and means for varying the excitation of said control winding in response to the speed of said driven member.

3. In a speed control arrangement for an induction clutch having a driving member and a driven member, a magnetizing winding on one of said members, an amplidyne exciter supplying current to said winding, a shunt field winding for said exciter, a source of alternating current, a full wave rectifier having its input terminals connected to said source and its output terminals connected in series with said shunt field winding, a control winding for said exciter arranged differentially with respect to said shunt field winding, a shunt wound generator supplying current to said control winding, means for driving said generator at a speed proportional to the speed of said driven member, and a variable resistor in the shunt field circuit of said generator.

ERNST F. W. ALEXANDERSON.